US012537387B2

(12) United States Patent
Stahlfeld et al.

(10) Patent No.: US 12,537,387 B2
(45) Date of Patent: Jan. 27, 2026

(54) PRIVACY-PRESERVING CONFIGURATION OF LOCATION-SPECIFIC ELECTRICAL LOAD MODELS

(71) Applicant: X Development LLC, Mountain View, CA (US)

(72) Inventors: Phillip Ellsworth Stahlfeld, Mountain View, CA (US); Ananya Gupta, San Francisco, CA (US); Xinyue Li, San Mateo, CA (US); Lucas Michael Ackerknecht, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 655 days.

(21) Appl. No.: 17/959,948

(22) Filed: Oct. 4, 2022

(65) Prior Publication Data
US 2024/0113555 A1    Apr. 4, 2024

(51) Int. Cl.
| H02J 13/00 | (2006.01) |
| G05B 13/02 | (2006.01) |
| G05B 13/04 | (2006.01) |

(52) U.S. Cl.
CPC .... *H02J 13/00002* (2020.01); *G05B 13/0265* (2013.01); *G05B 13/042* (2013.01); *H02J 2203/20* (2020.01)

(58) Field of Classification Search
CPC ............ H02J 13/00002; H02J 2203/20; G05B 13/0265; G05B 13/042
See application file for complete search history.

(56) References Cited

U.S. PATENT DOCUMENTS

| 8,359,124 | B2 | 1/2013 | Zhou et al. |
| 9,671,843 | B2 | 6/2017 | Ellis et al. |
| 10,755,295 | B2 | 8/2020 | Illic et al. |
| 11,139,961 | B2 | 10/2021 | Angel et al. |
| 11,188,791 | B2 | 11/2021 | Choudhury et al. |
| 11,373,115 | B2 * | 6/2022 | Kopp ..................... G06V 20/56 |

(Continued)

FOREIGN PATENT DOCUMENTS

| CN | 113609521 | | 11/2021 | |
| CN | 114202070 | A * | 3/2022 | ............. G06N 20/00 |
| WO | WO 2021/118452 | | 6/2021 | |

OTHER PUBLICATIONS

Arif et al., "Load modeling—A review," IEEE Transactions on Smart Grid, Nov. 2018, 9(6):5986-5999.

(Continued)

*Primary Examiner* — Thomas C Lee
*Assistant Examiner* — Michael V Farina
(74) *Attorney, Agent, or Firm* — Fish & Richardson P.C.

(57) ABSTRACT

Methods, systems, and apparatus, including medium-encoded computer program products, for configuring location-specific electrical load models while preserving privacy. A first machine learning model configured to predict electrical load curves of an electrical utility grid can be obtained from a server. Load values associated with a particular region of the electrical utility grid can be obtained. The load values can be applied as calibration input to the first machine learning model to produce first adjustment parameters for the first machine learning model. The first adjustment parameters can be provided to the server.

20 Claims, 6 Drawing Sheets

(56) References Cited

U.S. PATENT DOCUMENTS

| | | | |
|---|---|---|---|
| 2016/0042049 A1* | 2/2016 | Shilts | G06Q 50/06 |
| | | | 707/603 |
| 2019/0236725 A1* | 8/2019 | Benjamin | G06N 5/022 |
| 2019/0297395 A1* | 9/2019 | Huang | H04N 7/183 |
| 2020/0293887 A1 | 9/2020 | Brouwer et al. | |
| 2020/0379494 A1 | 12/2020 | Wong et al. | |
| 2022/0092346 A1* | 3/2022 | Jones | G06F 18/285 |
| 2023/0177349 A1* | 6/2023 | Balakrishnan | H04L 67/10 |
| | | | 706/25 |
| 2023/0359907 A1* | 11/2023 | Augenstein | G06N 5/022 |
| 2024/0063637 A1* | 2/2024 | Chen | G06Q 50/06 |

OTHER PUBLICATIONS

Chamikara et al., "Privacy preserving distributed machine learning with federated learning," Computer Communications, Apr. 2021, 171:112-125.

Chen et al., "Electrical load modeling with considering distribution network," 2007 iREP Symposium-Bulk Power System Dynamics and Control-VII. Revitalizing Operational Reliability, Aug. 2007, 6 pages.

Eia.gov [online], "How many smart meters are installed in the United States, and who has them?," last updated Nov. 2, 2021, retrieved on Aug. 17, 2022, retrieved from URL<https://www.eia.gov/tools/faqs/faq.php?id=108&t-3/>, 3 pages.

Fan et al., "Federated Few-Shot Learning with Adversarial Learning," 2021 19th International Symposium on Modeling and Optimization in Mobile, Ad hoc, and Wireless Networks (WiOpt), Oct. 2021, 10 pages.

Ju et al., "Load modeling for wide area power system," International Journal of Electrical Power & Energy Systems, May 2011, 33(4):909-917.

Kosterev et al., "Load modeling in power system studies: WECC progress update," 2008 IEEE Power and Energy Society General Meeting-Conversion and Delivery of Electrical Energy in the 21st Century, Jul. 2008, 8 pages.

Li et al., "Federated Learning Systems: Vision, Hype and Reality for Data Privacy and Protection," CoRR, Jul. 2019, arxiv.org/abs/1907.09693, 44 pages.

Milanovic et al., "International industry practice on power system load modeling," IEEE Transactions on Power Systems, Aug. 2013, 28(3):3038-3046.

Muthukumar, "Few-Shot Learning Text Classification in Federated Environments," 2021 Smart Technologies, Communication and Robotics (STCR), Oct. 2021, pp. 1-3.

Snell et al., "Prototypical networks for few-shot learning," Advances in neural information processing systems 30, 2017, 11 pages.

Truex et al., "A hybrid approach to privacy-preserving federated learning," AISec'19 Proceedings of the 12th ACM workshop on artificial intelligence and security, Nov. 2019, pp. 1-11.

Wang et al., "Generalizing from a few examples: A survey on few-shot learning," ACM computing surveys, May 2021, 53(3):1-34.

* cited by examiner

PRIVACY-PRESERVING CONFIGURATION OF LOCATION-SPECIFIC ELECTRICAL LOAD MODELS

BACKGROUND

Electrical power grids are interconnected networks of power sources, power loads, and power delivery and regulating components. The distribution of electricity over a power grid can include transmission, which typically occurs at high voltage and over large distances, and distribution, which typically occurs at lower voltage and over shorter distances. For example, a power plant can generate electricity and transmit the electricity to substations.

SUMMARY

This specification describes technologies relating to configuring location-specific electrical load models while preserving privacy. The technologies can include determining local load curve prediction models that are tailored to a particular region; determining a generalized load curve prediction model that is iteratively improved by the local training; and protecting the privacy of electrical use data.

Particular embodiments of the subject matter described in this specification can be implemented so as to realize one or more of the following advantages. The techniques described below can be used to train a machine learning model to make accurate predictions for one or more geographic regions while preserving the privacy of customer meter data. In addition, the techniques described below use training of local models to improve a general model. The improved general model can then be specialized to produce improved regional models. The cycle of improving the general model, then creating specialized regional models continues to preserve customer privacy.

One aspect features obtaining, from a server, a first machine learning model configured to predict electrical load curves of an electrical utility grid. Load values associated with a particular region of the electrical utility grid can be obtained. The load values can be applied as calibration input to the first machine learning model to produce first adjustment parameters for the first machine learning model. The first adjustment parameters can be provided to the server.

One or more of the following features can be included. The first machine learning model can be configured according to the first adjustment parameters. An input can be processed using the first machine learning model to produce an electrical load curve at the region of the electrical utility grid, and the electrical curve can be provided. Second adjustment parameters can be obtained from the server, and the first machine learning model can be configured according to the second adjustment parameters. A second machine learning model configured, at least in part, according to the first adjustment parameters can be obtained from the server. The first adjustment parameters can include one or more gradients. Obtaining load values associated with a particular region of the electrical utility grid can include receiving data from a meter over a network. The meter can be an advanced metering infrastructure (AMI) meter. Obtaining load values associated with a particular region of the electrical utility grid can include reading data stored on a storage device or on a storage system. At least a subset of the load values can be provided by an automated meter reading (AMR) system. The first machine learning model can be trained to predict generalized electrical load curves for a generic electrical utility grid. The number of applied load values used as calibration input to the first machine learning model cannot exceed ten million.

Another aspect features a server providing, to a computing device, a first machine learning model configured to predict electrical load curves of an electrical utility grid. The server can obtain, from the computing device, first adjustment parameters of the first machine learning model that were determined at least in part by applying load values associated with a particular region of the electrical utility grid as calibration input to the first machine learning model.

One or more of the following features can be included. The first adjustment parameters can include one or more gradients. Second adjustment parameters can be determined, at least in part, from the first adjustment parameters. The second adjustment parameters can be computed using a mean or a weighted mean. The second adjustment parameters can be provided to the computing device. The first machine learning model can be configured according to the first adjustment parameters to produce a second machine learning model and the second machine learning model can be provided to the computing device.

A further aspect features obtaining a request for a load curve at a specified region of an electrical grid. A third machine learning model can be determined for the specified region, and the third machine learning model can be configured, at least in part, according to adjustment parameters that were determined by applying load values from the region to a machine learning model. An input can be processed using a third trained machine learning model to produce an electrical load curve at the region of an electrical utility grid. The electrical load curve can be provided.

One or more of the following features can be included. The machine learning model can be trained to predict generalized electrical load curves for a generic electrical utility grid. The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1A:
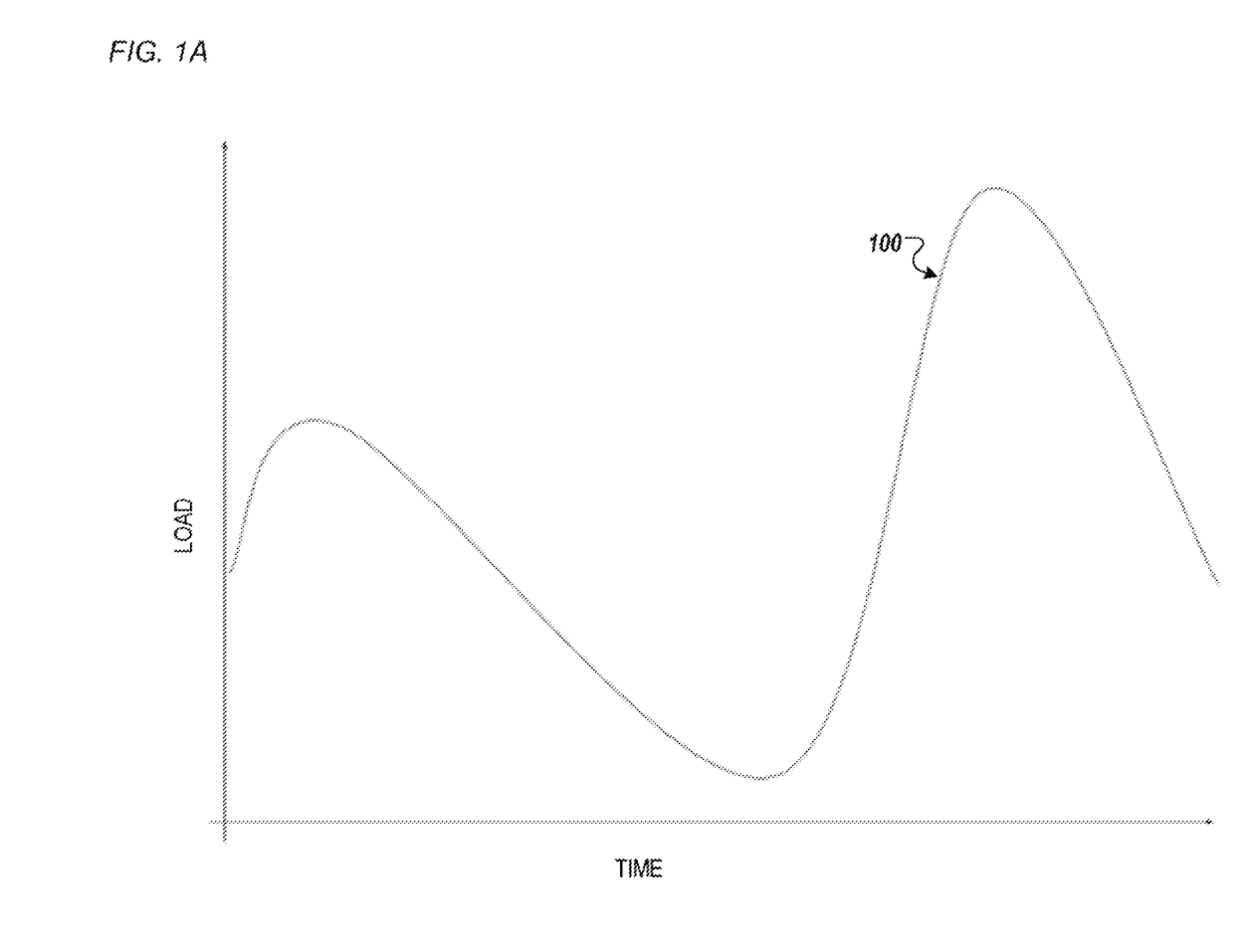
FIGS. 1A and 1B shows example load curves.

Simulations of an electrical grid are important tools for electrical grid operators as they enable the operators to determine how best to control the grid, including determining when to add electrical components, when to perform maintenance and on which components, how to prepare for atypical weather events, and so on. Grid simulations require accurate models of electrical parameters, which can include load and/or generation. FIG. 1A shows an example load curve 100 over a period of time (e.g., 1 day). Each point on the curve represents the load value (e.g., in megawatts) at a particular instant in time.

One approach that was considered is providing electrical parameter data to a simulation to obtain historical meter data for every load included in the simulation. However, this approach has several potential drawbacks, including: (i) meter data must be available for each load in the simulation, which is often not the case; (ii) historical data may not accurately represent future electrical parameters, as simulations are frequently forward-looking; and (iii) simulation engines often runs in central data centers, but meter data can be privacy-protected, and therefore unavailable to the central data center.

Figure 1B:
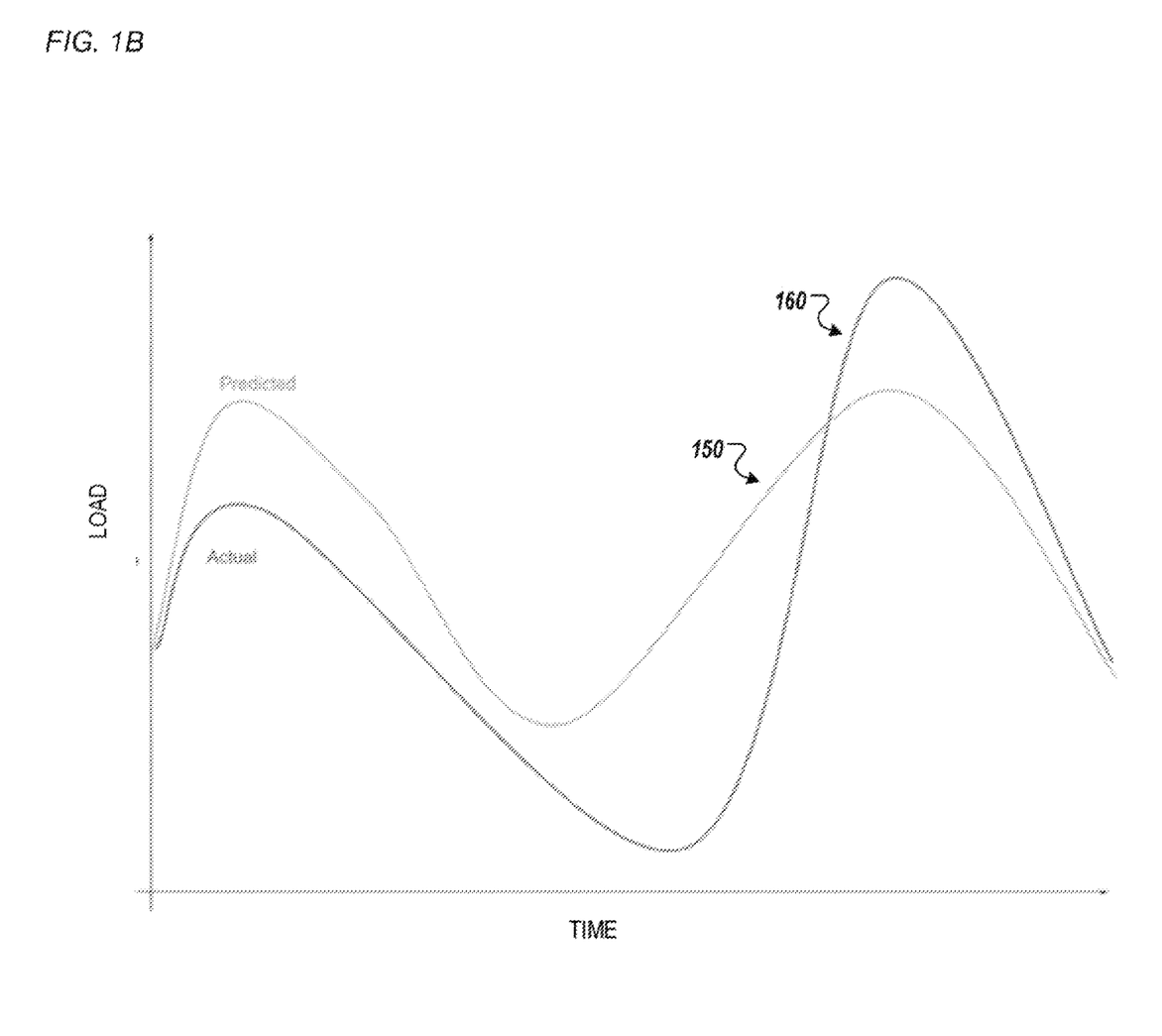

In another approach that was considered, load parameters can be approximated using a model, such as a machine learning model. The model can be configured to consider various factors including the types of building (residential, commercial, industrial, etc.), the area of the buildings, the number of floors, geographic location, and so on. However, if the load parameters vary substantially between regions and the model is trained on data from multiple regions, the load values in the predicted curve can differ from the actual values. FIG. 1B shows a predicted load curve 150 that is a poor approximation for the actual curve 160.

In still another approach that was considered, a model can be trained using a large corpus of data, which can result in generally accurate models. The model can be calibrated using data specific to a given region such that the model becomes accurate for a particular region. While this approach can produce effective models—i.e., models that produce accurate predictions—it can require sending meter data to a central data center, and as noted above, meter data can be protected by privacy regulations, and therefore cannot be transmitted to the central data center for use in training. Conversely, if models are trained only on local data, they will not benefit from training on a broad range of examples that can be available at a central data center.

This specification describes techniques that train a generalized load curve prediction model over a large corpus of available data. The model can be calibrated in a few-shot fashion using small amounts of data obtained from local meters. The model calibration can be performed at a regional server system (e.g., a data center operated by or for the utility company that owns the meters providing the data) to optimize the model for local predictions. Since the regional server system already has access to the meter data (e.g., for billing), and meter data never leaves the regional server system, privacy concerns are alleviated. In addition, model updates (e.g., gradients) can be sent from the regional server system to a central server system, where the model updates can be aggregated and applied to the generalized load curve, iteratively improving the generalized load curve prediction model. Since the model updates are transmitted instead of the meter data, customer privacy is protected. To summarize, the techniques of this specification provide at least three technical benefits: (i) determining local load curve prediction models that are tailored to a particular region; (ii) determining a generalized load curve prediction model that is iteratively improved by the local training; and (iii) protecting the privacy of meter data.

Figure 2:
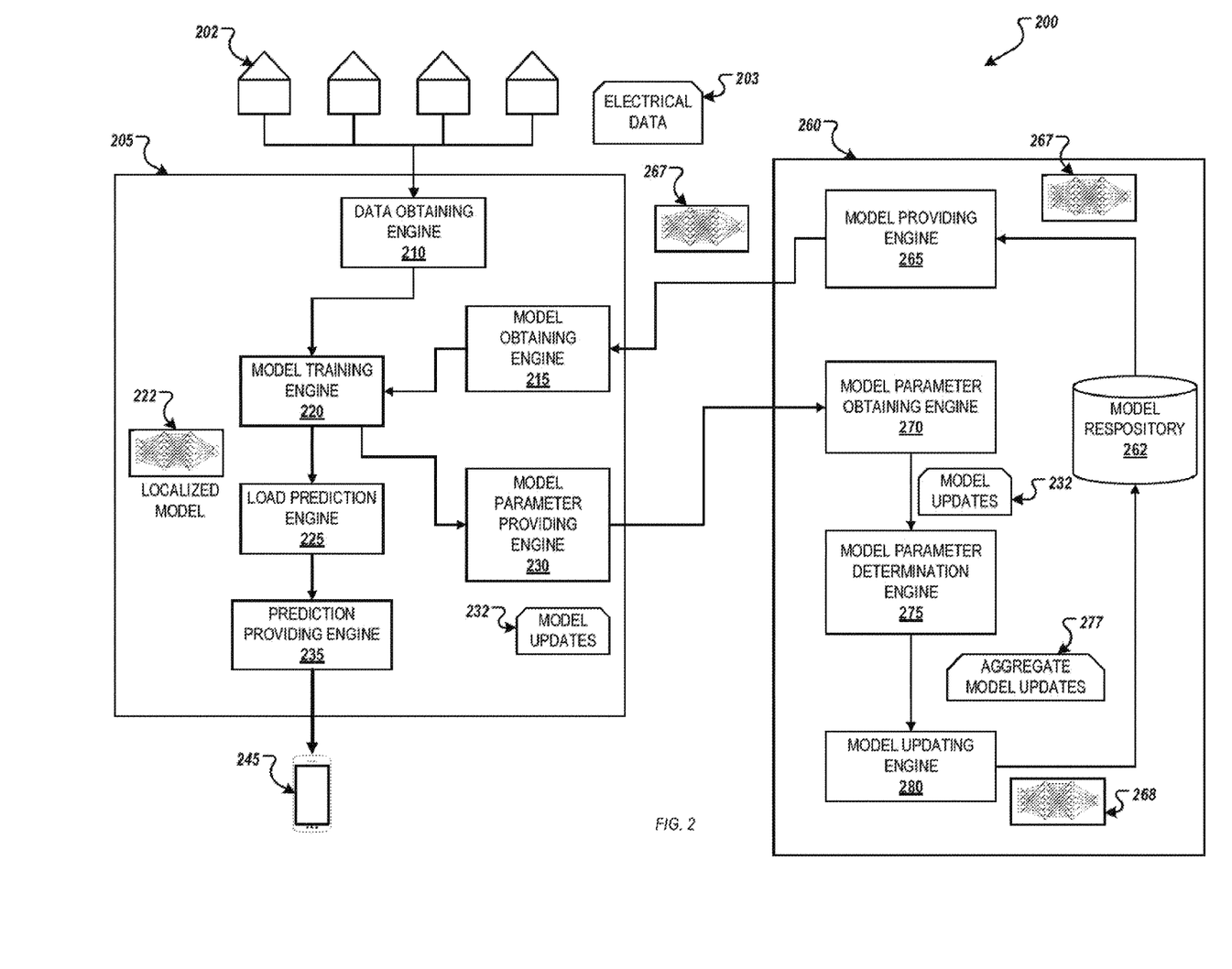
FIG. 2 shows an example of an environment for privacy-preserving training of electrical load models.

FIG. 2 shows an example of an environment for privacy-preserving training of electrical load models. The environment can include data sources 202, a regional server system 205, a central server system 260, and one or more user devices 245. While the regional server system 205 and the central server system 260 are shown as separate systems, the regional server system 205 and the central server system 260 can reside at the same or different physical locations, and the regional server system 205 and/or the central server system 260 can be distributed across physical locations.

The data sources 202 can be electricity users such as single-family homes, multi-family homes, standalone businesses, business parks, multiuse developments, etc. The data sources 202 can provide electrical data 203 relating to the electrical use by the data sources 202 to a regional server system 205. The electrical data 203 can be produced by electrical meters connected to a data provision infrastructure such as an automated meter reading (AMR) system or an advanced metering infrastructure (AMI).

The regional server system 205 can include one or more computing devices, for example, servers in a data center or in a Cloud hosting environment. The regional server system 205 can be included in (or coupled to) a local utility company's data center, among other locations, and can provide predictions about the region's electrical load.

The regional server system 205 can include a data obtaining engine 210, a model obtaining engine 215, a model training engine 220, a load prediction engine 225, a model parameter providing engine 230, and a prediction providing engine 235. The operation engines 215, 220, 225, 230, and 235 can be provided as one or more computer executable software modules, hardware modules, or a combination thereof. For example, one or more of the operation engines 215, 220, 225, 230, and 235 can be implemented as blocks of software code with instructions that cause one or more processors of the regional server system 205 to execute operations described herein. In addition or alternatively, one or more of the operations engines can be implemented in electronic circuitry such as, e.g., programmable logic circuits, field programmable logic arrays (FPGA), or application specific integrated circuits (ASIC).

The data obtaining engine 210 can obtain electrical data 203 from data sources 202 using various techniques. For example, if the regional server system 205 is coupled to an AMI infrastructure, and the data obtaining engine 210 can receive electrical data 203 over a network using the AMI protocols. In another example, the data obtaining engine 210 can receive electrical data 203 from AMR data collection devices. For example, the data obtaining engine 210 can provide an Application Programming Interface (API) that accepts data from AMR collection devices.

The model obtaining engine 215 can obtain electrical load prediction machine learning models 267 ("ML models," for brevity) using various techniques. For example, the model obtaining engine 215 can provide an API that enables a central server system 260 to provide ML models 267. In another example, the central server system 260 can provide an API, and the model obtaining engine 215 can invoke the API to obtain ML models 267. In another example, the model obtaining engine 215 can accept an ML model transmitted over a network using a networking protocol such as the Transmission Control Protocol/Internet Protocol (TCP/IP). The ML model 267 can be a recurrent neural network or another suitable type of machine learning model. In some implementations, the ML model 267 is configured to predict electrical load curves of an electrical utility grid. For example, the ML model 267 is trained to predict generalized electrical load curves for a generic electrical utility grid. In some implementations, the ML model 267 can be a model that has previously been updated (e.g., using the training techniques described below) to account for variations in one or more regional electric power grids.

The model training engine 220 can accept an ML model 267 from the model obtaining engine 215 and electrical data 203 from the data obtaining engine 210, and produce a localized model 222. By performing training using the electrical data 203 from data sources 202 in a region of interest to the regional server system 205, model training engine 220 can produce a localized model 222 that can provide predictions that are calibrated to the local conditions.

The model training engine 220 can provide model updates 232 produced during the training to the model parameter providing engine. The model updates 232 can be the gradients produced while training the localized model 222, e.g., using backpropagation. The gradients can be partial derivatives of the loss function for the localized model 222 being trained.

The model parameter providing engine 230 can provide the model updates 232 to the central server system 260 using various techniques. For example, the model parameter providing engine 230 can include an API, and the central server system 260 can invoke the API to obtain the model updates. The central server system 260 can include an API, and the model parameter providing engine 230 can invoke the API to provide the model updates 232. The model parameter providing engine 230 can transmit a message, e.g., over TCP/IP, containing the model updates 232, and the central server system 260 can receive the message. Since the region server system 205 provides only model updates 232 to the central server system 260, the privacy of the data sources 202 is protected, as the customer electrical data 203 is not provided to the central server system 260.

The load prediction engine 225 can process an input that includes simulation parameters using the localized ML model 222 to produce a load prediction. The load prediction can be a predicted load at one or more future time periods. The simulation parameters can describe the environment in which the load will occur. Such parameters can include structure type (e.g., residential, commercial, industrial, storage, etc.); size (e.g., in square feet); number of floors; geographic location; size and/or type of solar panels (if any are present); date and/or season; business hours (where applicable); presence, type and capacity of refrigeration units; and so on.

The prediction providing engine 235 can provide predictions to user devices 245. The prediction can be encoded in a human-readable and/or machine-readable format such text, a tabular format, JavaScript Object Notation (JSON), Extensible Markup Language (XML) and/or user interface presentation, which, when rendered by a user device, causes the user device 245 to display the prediction.

The user device 245 can be an electronic device that is capable of communicating over the network. Example client devices 245 can include personal computers, mobile communication devices, e.g., smart phones and tablets. A user device 245 can include a display that can be a touch screen display capable of detecting user interactions such as "taps" and "swipes." The client device 245 can include other input and output mechanisms and/or peripheral devices.

The central server system 260 can include one or more computing servers, for example, servers in a data center or in a Cloud hosting environment. The central server system 260 can include one or more model repositories 262, a model providing engine 265, a model parameter obtaining engine 270, a model parameter determination engine 275 and a model updating engine 280.

The model repositories 262 can be any suitable storage mechanisms such as a file system and/or relational databases. The model repositories 262 can be configured to store ML models 267 and can store metadata associated with ML models 267 such as a version number, creation date, owner, access control lists and so on. Model repositories 262 can be physically present in the central server system 260 or coupled to the central server system 260 by one or more networks.

The model providing engine 265 can obtain ML models 267 from model repositories 262 and can provide the ML models 267 to the regional server system 205 using various techniques. In some implementations, the model providing engine 265 includes an API that enables the regional server system 205 to obtain ML models 267. In some implementations, the model providing engine 265 includes a web server. The web server can accept HyperText Transfer Protocol (HTTP) requests from the regional server system 205 and respond with ML models 267. In some implementations, the model providing engine 265 can include ML models 267 in a message and transfer the message to the regional server system 205 in a TCP/IP message.

The model parameter obtaining engine 270 can accept model updates 232 from the regional server system 205 using a variety of techniques (e.g., by providing an API or by accepting TCP/IP messages) and provide the model updates 232 to the model parameter determination engine 275. As described above, the model update 232 can be gradients, and can further include metadata such as the version of the model that was updated by the regional server system 205.

The model parameter determination engine 275 can accept model updates 232 from one or more regional servers system 205 and determine aggregate model updates 277 appropriate for one or more ML models 267. In some implementations, the model parameter determination engine 275 can aggregate model updates 232 received from one or more regional server system 205 and can determine aggregate model updates 277 to apply to the ML model 267.

The model updating engine 280 can accept aggregate model updates 277 from the model parameter determination engine 275 and apply the aggregate model updates 277 to one or more ML models 267 to produce updated ML models 268. The model updating engine 280 can apply the aggregate model updates 277 (e.g., gradients) using machine learning training techniques. The model updating engine 280 can provide the updated ML models 268 to the model repository 262. The model updating engine 280 can include metadata with the updated ML model 268, for example, a new version number indicating that the updated ML model 268 is a new ML model.

Figure 3:
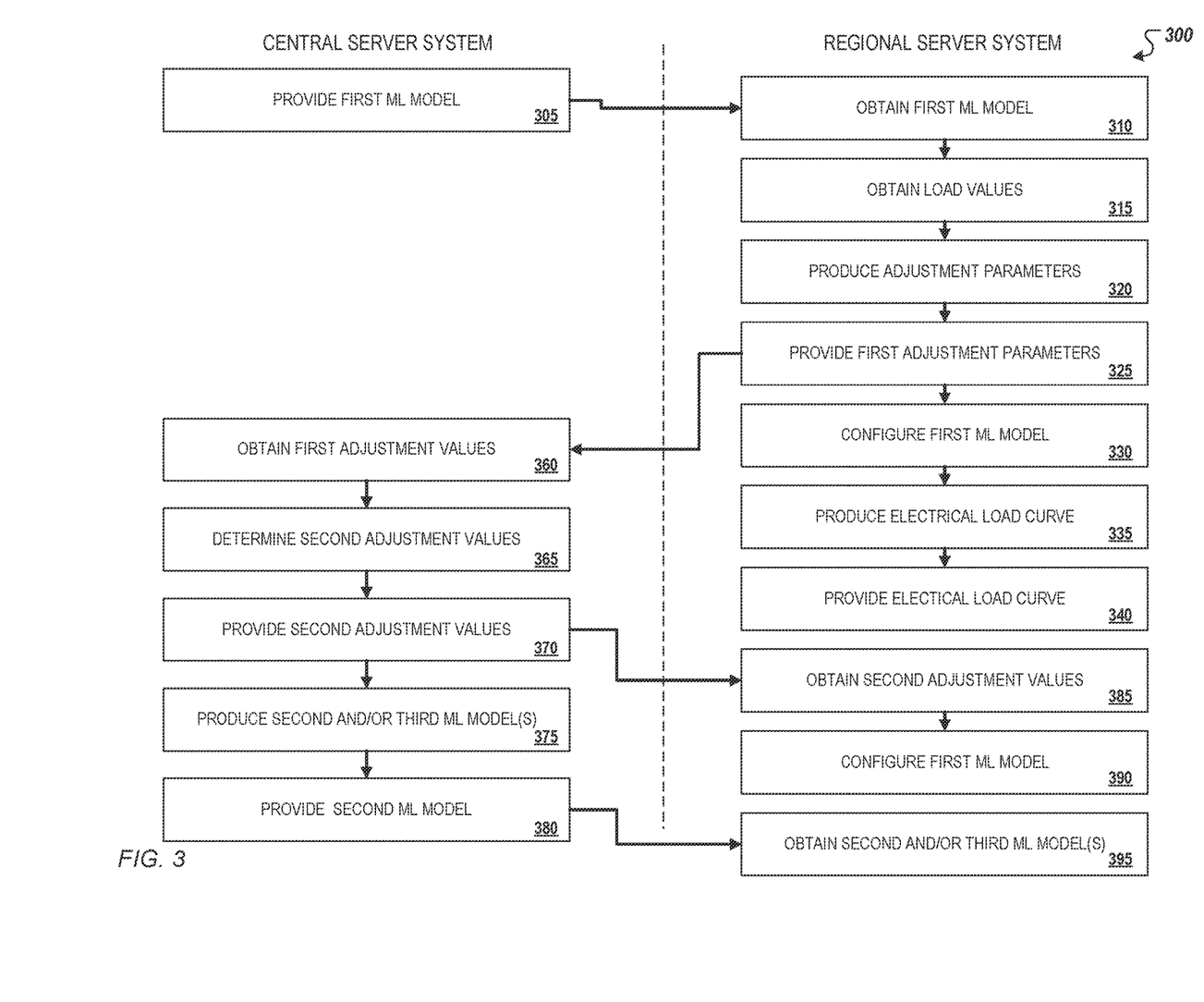
FIG. 3 is a flow diagram of an example process for privacy-preserving training of electrical load models.

FIG. 3 is a flow diagram of an example process for privacy-preserving training of electrical load models. For convenience, the process 300 will be described as being performed by one or more systems for privacy-preserving training of electrical load models, e.g., the regional server system 205 and the central server system 260 of FIG. 2, appropriately programmed to perform the process. Operations of the process 300 can also be implemented as instructions stored on one or more computer readable media, which may be non-transitory, and execution of the instructions by one or more data processing apparatus can cause the one or more data processing apparatus to perform the operations of the process 300. One or more other components described herein can perform the operations of the process 300.

The central server system can provide a first machine learning model (305) to a computing device, such as a regional server system, a first machine learning model that is configured to predict electrical load curves of an electrical utility grid. In some implementations, the central server can include an application programming interface (API) that, when called by the regional server system, causes the central server system to transmit the first machine learning model to the regional server system. For example, the API can be a web services API or a remote procedure call (RPC). In some implementations, the central server can transmit a message to a regional server system. For example, the central server system can transmit a message using Transport Control Protocol/Internet Protocol (TCP/IP) or using HyperText Transfer Protocol (TCP/IP).

In some implementations, the first machine learning model is configured to predict electrical load curves of an electrical utility grid. For example, the first machine learning model can be trained to predict generalized electrical load curves for a generic electrical utility grid.

The regional server system can obtain (310) from the central server system, the first machine learning model using the technique provided by the central server. For example, if the central server system provides an API, the regional server system can call the API to obtain the first machine learning model. If the central server system transmits a message using TCP/IP or HTTP, the regional server system can receive the message using the corresponding protocol.

The regional server system can obtain (315) load values associated with a particular region of the electrical utility grid using various approaches. In some implementations, the regional server system obtains load values directly or indirectly from electrical meters on customer (i.e., electrical users) premises. The meters can be any type of meter, including AMR and AMI meters, and the load values can be obtained directly (e.g., AMI transmitting load data over a network) or indirectly (e.g., by reading AMR data stored on a storage system or non-automated meter data recorded on a storage device). The load values can include electrical usage at one or more points in time or electrical usage over a time interval. The load values can be associated with the time at which the electrical usage was measured.

The regional server system can produce (320) first adjustment parameters for the first machine learning model using the load values as calibration input to the first machine learning model. The regional server system can evaluate the first machine learning model using the load values to produce adjustment parameters for the model, which can be gradients determined using machine learning model training techniques and by using the values predicted by the first machine learning model and the actual values included in the load values to compute model losses.

The regional server system can provide (325) the first adjustment parameters to the server. In some implementations, the regional server system can include an API (e.g., web services or RPC), which when called by a central server system, results in the regional server transmitting the adjustment parameters to the central server system. In some implementations, the regional server system can transmit the first adjustment parameters as messages using TCP/IP or HTTP. The regional server system can further provide metadata, such as the number of load values used when determining the first adjustment parameters, an identifier of the regional server system, information about the regional server system (e.g., the region location), and so on. Since the regional server is providing only adjustment parameters and metadata not associated with particular customers, and not the underlying data (e.g., meter data) used to determine the adjustment parameters, customer privacy is protected. The central server does not receive underlying data in the process 300.

The regional server system can configure (330) the first machine learning model according to the first adjustment parameters. The regional server system can apply the first adjustment parameters, which can be machine learning model gradients, to determine adjusted weights for the nodes in the first machine learning. By applying the adjustment parameters, the regional server system creates a machine learning model that has been configured to make predictions that are calibrated to the local conditions at the regional server system.

The regional server system can process an input using the first trained machine learning model to produce (335) an electrical load curve at the region of the electrical utility grid. The input can include simulation parameters such as structure type(s) (e.g., residential, commercial, industrial, storage, etc.), size (e.g., in square feet), number of floors, geographic location, date, time, etc., as described above.

The regional server system can provide (340) the electrical load curve. The regional server system can include an API (e.g., web services or RPC), which, when called by a user device, results in the regional server transmitting the load curve to a user device. In some implementations, the regional server system can transmit the load curve as one or more messages using TCP/IP or HTTP or as user interface presentation data. Processes for providing load curves are described further in reference to FIG. 4.

The central server system can obtain (360) first adjustment parameters of the first machine learning model that were determined at least in part by applying load values associated with a particular region of the electrical utility grid as calibration input to the first machine learning model. The central server system can obtain the first adjustment parameters using the technique of the regional server system. For example, if the regional server system provides an API, the central server system can call the API to obtain the first machine learning model. If the regional server system transmits a message using TCP/IP or HTTP, the central server system can receive the message using the same protocol.

The central server system can determine (365), at least in part from the first adjustment parameters, second adjustment parameters. The central server system can obtain adjustment parameters from one or more regional server systems, and determine a statistical combination of the adjustment parameters. For example, the central server system can compute a mean, a median, a weighted mean (e.g., weighted by the number of load values used to compute each collection of adjustment parameters), and so on.

The central server system can provide (370), to the computing device (e.g., the regional server system), the second adjustment parameters. The central server system can include an API (e.g., web services or RPC), which when called by a regional server system, results in the central server transmitting the second adjustment parameters to the regional server system. In some implementations, the central server system can transmit the second adjustment parameters as one or more messages using TCP/IP or HTTP.

The central server system can produce (375) a second machine learning model and/or a third machine learning model by configuring the first machine learning model according to the first and second adjustment parameters. By applying the first adjustment parameters, the central server system can produce a second machine learning model that is configured to make predictions that are calibrated to the local conditions at the regional server system that provided the adjustment values. By applying the second adjustment parameters, the central server system can produce a third machine learning model that has been trained on additional data, and therefore can produce predictions that are generally more accurate than predictions produced by first machine learning model, although it is not calibrated for any particular region.

The central server system can apply the first adjustment parameters, which can be machine learning model gradients, to the first machine learning model to determine adjusted weights for the nodes in the first machine learning model. The central server system can use techniques for applying gradients to nodes of a machine learning model to produce the second machine learning model that includes nodes with weight parameters adjusted according to the gradient. The central server system can further apply the second adjustment parameters to the first machine learning model to determine adjusted weights for the nodes in the first machine learning model using the same or similar techniques for applying a gradient to produce the third machine learning model that includes nodes with weight parameters adjusted according to the gradient.

Once the central server system has adjusted the weights, the central server system can store the adjusted model parameters of the second machine learning model and/or the third machine learning model. In both cases, the central server system can store the model weights for the machine learning models (second and third) on a storage device. When the central server system provides machine learning models (e.g., using the techniques of operation 305 or similar operations, as described further below), the central server can, in some implementations, provide the second machine learning model.

The central server system can provide (380) to the regional server system, the second machine learning model. The central server system can include an API (e.g., web services or RPC), which when called by a regional server system, results in the central server transmitting the second machine learning model to the regional server system. In some implementations, the central server system can transmit the second machine learning model as one or more messages using TCP/IP or HTTP.

The regional server system can obtain (385), from the central server system, second adjustment values. The regional server system can call an API provided by the central server system or receive messages sent by the central server system.

The regional server system can configure (390) the first machine learning model according to the second adjustment parameters. The regional server can use the techniques described in operation 375 or similar operations. By configuring the first machine learning model in this way, the regional server will produce a machine learning model that has been trained on additional data (as compared to the training of the first machine learning obtained in operation 310), but the newly trained model will be less specialized than the first machine learning model trained according to operation 330. For this reason, the regional server can retain both the first machine learning configured in operation 330 and the machine learning model configured by operation 390.

The regional server system can obtain (395), from the central server system, a second and/or third machine learning model that was configured, at least in part, according to the first and/or second adjustment parameters, respectively. The regional server system can call an API provided by the central server system or receive messages sent by the central server system.

Figure 4:
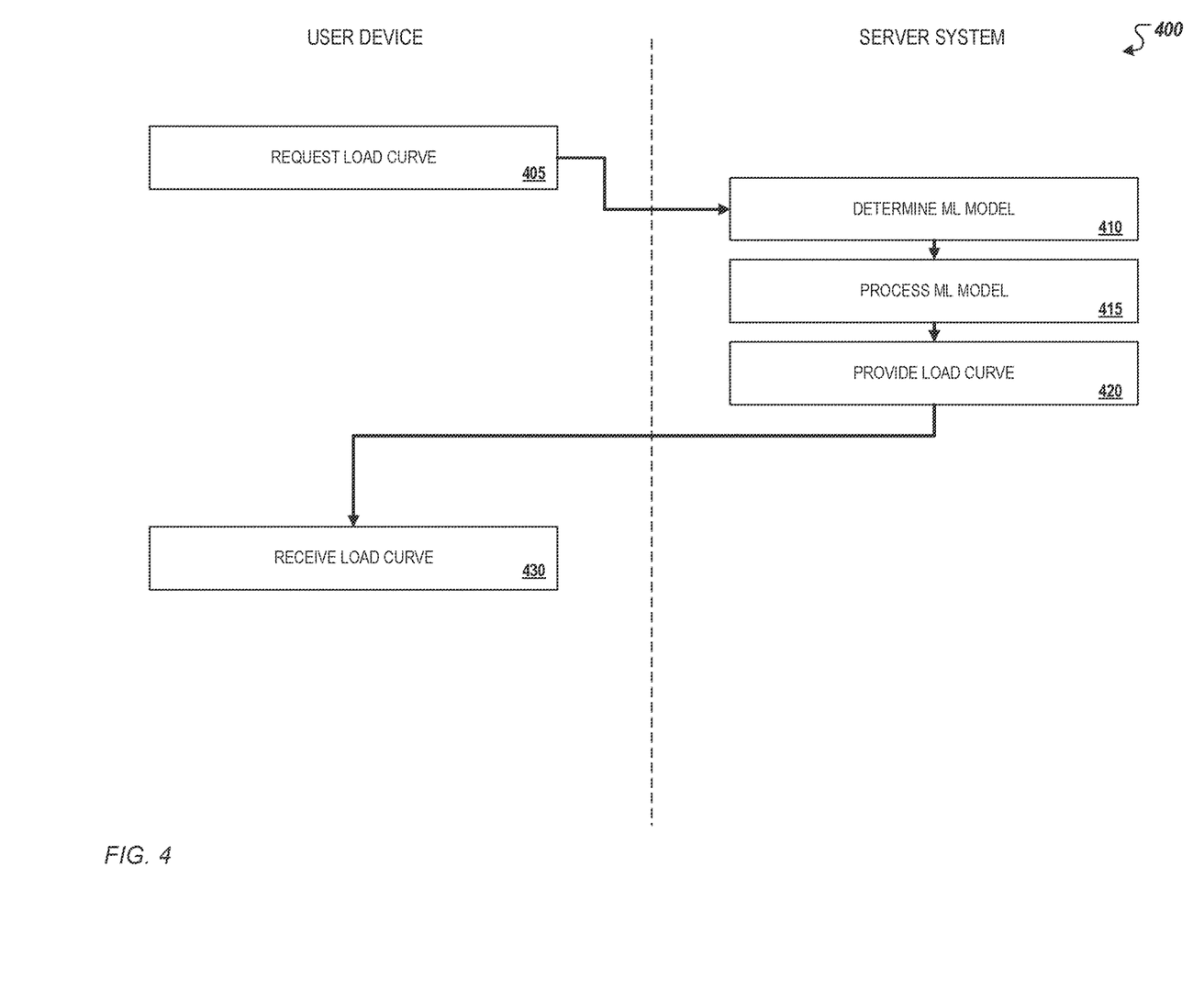
FIG. 4 is a flow diagram of an example process for providing a load curve.

FIG. 4 is a flow diagram of an example process for providing a load curve. For convenience, the process 400 will be described as being performed by one or more systems for privacy-preserving training of electrical load models, e.g., the regional server system 205 and/or the central server system 260 of FIG. 2, and by user devices 245 of FIG. 2, appropriately programmed to perform the process. Operations of the process 400 can also be implemented as instructions stored on one or more computer readable media, which may be non-transitory, and execution of the instructions by one or more data processing apparatus can cause the one or more data processing apparatus to perform the operations of the process 400. One or more other components described herein can perform the operations of the process 400.

The user device can request (405) a load curve of a server system, which can be a regional server system or a central server system. The user device can call an API provided by the server system, and can specify simulation parameters in the request. As described above, simulation parameters can describe the environment in which the load will occur, including the region, structure types, geographic location, etc.

The server system can determine (410) a machine learning model appropriate for the request using the region described in the request. When the server system is a regional server system, the regional server system can select the machine learning model most recently produced by configuring a model according to adjustment parameters or most recently received from the central server system.

As described above (e.g., in reference to operation 325), the central server system can receive region information when it obtains adjustment parameters. Therefore, when the central server system produces a machine learning model using the adjustment data, the central server system can associate the region data with that machine learning model.

The central server system can then use various techniques to compare the region data included in the request with the region data associated with machine learning models stored by the central server system to determine an appropriate machine learning model. For example, if regions are indicated by unique identifiers, the central server system can match identifiers. If no identifiers match, the central server system can select the model trained on the largest number of training examples. In another example, if a region is defined by coordinates, the central server system can select a model that is associated with region data having the largest overlap. If a region is defined by characteristics (e.g., latitude, longitude, elevation, weather properties, etc.), the central server system can select a machine learning model with the largest characteristics overlap. The central server system can also combine techniques, for example, by using region overlap and characteristics.

The server system can process (415) an input that includes the simulation parameters using the machine learning model selected in operation 410 to produce a load prediction. The server system can process the input using machine learning model evaluation techniques.

The server system can provide (420) and the user device can receive (430) the load curve. In some implementations, the server system can include the load curve as a response to the API call of operation 405. In some implementations, the server system can include the load curve in one or more messages transmitted to the user device, e.g., using TCP/IP or HTTP. In some implementations, the server system can provide user interface presentation data, which, when rendered by a user device, causes the user device 245 to display the load curve.

Figure 5:
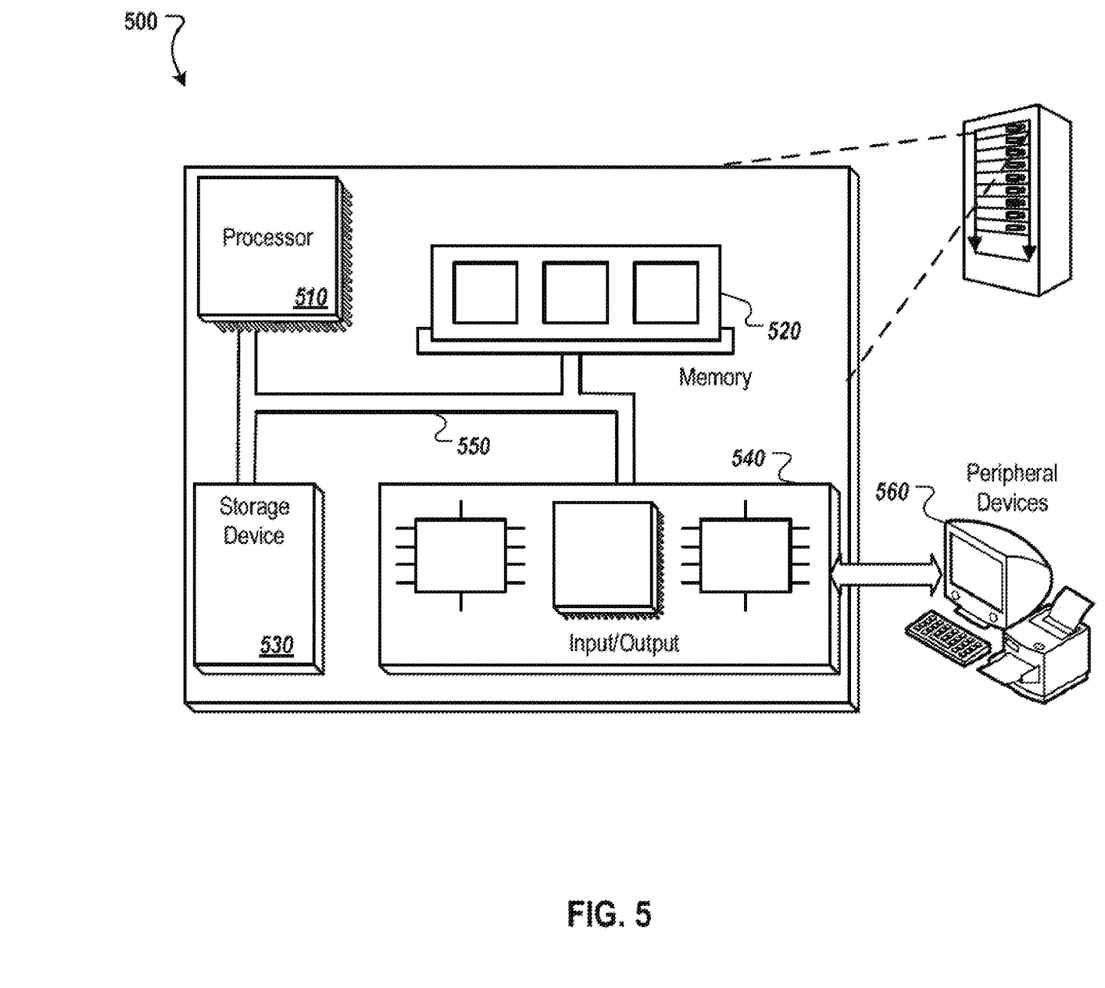
FIG. 5 is a block diagram of an example computer system.

FIG. 5 is a block diagram of an example computer system 500 that can be used to perform operations described above.

The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and peripheral devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method implemented on one or more computing devices, the method comprising:
    obtaining, by a first server and from a second server, a first machine learning model configured to predict electrical load curves of an electrical utility grid, wherein the first server is associated with a particular region of the electrical utility grid;
    obtaining, by the first server and from a plurality of electric meters within the particular region, load values associated with the particular region of the electrical utility grid;
    applying, by the first server, the load values as calibration input to the first machine learning model to produce first adjustment parameters for the first machine learning model; and
    providing, to the second server, the first adjustment parameters without disclosing the load values to the second server, thereby, preserving privacy of customers associated with the load values;
    configuring, by the first server, the first machine learning model according to the first adjustment parameters; and
    processing an input using the first machine learning model to produce a predicted electrical load curve at the particular region of the electrical utility grid.

2. The computer implemented method of claim 1, further comprising:
    providing the electrical load curve.

3. The computer implemented method of claim 1, further comprising:
    obtaining, from the second server, second adjustment parameters; and
    configuring, by the first server, the first machine learning model according to the second adjustment parameters.

4. The computer implemented method of claim 1, further comprising:
    obtaining, from the second server, a second machine learning model configured, at least in part, according to the first adjustment parameters.

5. The computer implemented method of claim 1, wherein the first adjustment parameters include one or more gradients.

6. The computer implemented method of claim 1, wherein obtaining, by the first server and from a plurality of electric meters within the particular region, load values associated with the particular region of the electrical utility grid comprises: receiving data from a meter over a network.

7. The computer implemented method of claim 6, wherein the meter is an advanced metering infrastructure (AMI) meter.

8. The computer implemented method of claim 7, wherein at least a subset of the load values are provided by an automated meter reading (AMR) system.

9. The computer implemented method of claim 1, further comprising obtaining load values associated with the particular region of the electrical utility grid by reading data stored on a storage device or on a storage system.

10. The computer implemented method of claim 1, wherein the first machine learning model is trained to predict generalized electrical load curves for a generic electrical utility grid.

11. The computer implemented method of claim 1 wherein the number of applied load values used as calibration input to the first machine learning model does not exceed ten million.

12. A system comprising one or more computers and one or more storage devices storing instructions that when executed by the one or more computers cause the one or more computers to perform operations comprising:
 obtaining, by a first server and from a second server, a first machine learning model configured to predict electrical load curves of an electrical utility grid, wherein the first server is associated with a particular region of the electrical utility grid;
 obtaining, by the first server and from a plurality of electric meters within the particular region, load values associated with the particular region of the electrical utility grid;
 applying, by the first server, the load values as calibration input to the first machine learning model to produce first adjustment parameters for the first machine learning model; and
 providing, to the second server, the first adjustment parameters without disclosing the load values to the second server, thereby, preserving privacy of customers associated with the load values;
 configuring, by the first server, the first machine learning model according to the first adjustment parameters; and
 processing an input using the first machine learning model to produce a predicted electrical load curve at the particular region of the electrical utility grid.

13. The system of claim 12, wherein the operations further comprise:
 providing the electrical load curve.

14. The system of claim 12, wherein the operations further comprise:
 obtaining, from the second server, second adjustment parameters; and
 configuring, by the first server, the first machine learning model according to the second adjustment parameters.

15. The system of claim 12, wherein the operations further comprise:
 obtaining, from the second server, a second machine learning model configured, at least in part, according to the first adjustment parameters.

16. The system of claim 12, wherein the first adjustment parameters include one or more gradients.

17. The system of claim 12, wherein obtaining, by the first server and from a plurality of electric meters within the particular region, load values associated with the particular region of the electrical utility grid comprises: receiving data from a meter over a network.

18. The system of claim 17, wherein the meter is an advanced metering infrastructure (AMI) meter.

19. The system of claim 12, further comprising obtaining load values associated with the particular region of the electrical utility grid by reading data stored on a storage device or on a storage system.

20. One or more non-transitory computer-readable storage media storing instructions that when executed by one or more computers cause the one or more computers to perform operations comprising:
 obtaining, by a first server and from a second server, a first machine learning model configured to predict electrical load curves of an electrical utility grid, wherein the first server is associated with a particular region of the electrical utility grid;
 obtaining, by the first server and from a plurality of electric meters within the particular region, load values associated with the particular region of the electrical utility grid;
 applying, by the first server, the load values as calibration input to the first machine learning model to produce first adjustment parameters for the first machine learning model; and
 providing, to the second server, the first adjustment parameters without disclosing the load values to the second server, thereby, preserving privacy of customers associated with the load values;
 configuring, by the first server, the first machine learning model according to the first adjustment parameters; and
 processing an input using the first machine learning model to produce a predicted electrical load curve at the particular region of the electrical utility grid.

* * * * *